United States Patent [19]

Pekau

[11] 4,012,711
[45] Mar. 15, 1977

[54] PROCESS AND APPARATUS FOR RECORDING ACOUSTICAL HOLOGRAMS

[75] Inventor: Dietlind Pekau, Taufkirchen, Germany

[73] Assignee: Siemens Aktiengesellschaft, Berlin & Munich, Germany

[22] Filed: Oct. 17, 1974

[21] Appl. No.: 515,532

[30] Foreign Application Priority Data

Oct. 19, 1973 Germany .......................... 2352672

[52] U.S. Cl. ............................. 340/1 R; 340/5 H; 340/8 FT
[51] Int. Cl.$^2$ ........................................ G01S 9/66
[58] Field of Search ............. 340/5 H, 5 MP, 8 FT

[56] References Cited

UNITED STATES PATENTS

| | | | |
|---|---|---|---|
| 3,159,023 | 12/1964 | Steinbrecher | 340/8 FT |
| 3,632,183 | 1/1972 | Haines et al. | 340/5 H |
| 3,881,466 | 5/1975 | Wilcox | 340/5 MP |
| 3,889,226 | 6/1975 | Hildebrand | 340/5 H |

Primary Examiner—Richard A. Farley
Attorney, Agent, or Firm—Hill, Gross, Simpson, Van Santen, Steadman, Chiara & Simpson

[57] ABSTRACT

An apparatus and method for recording acoustical holograms characterized by the transmitting transducers having a directional characteristic, a transducer, which is either the transmitting or the receiving transducer, is mounted for rotation about at least one and preferably two axes, and the apparatus includes a reflector, which has at least a parabolic cross section taken on a plane extending perpendicular to the one axis, surrounds the rotatable transducer. When using the rotatable transmitting transducer, a plurality of stationary receiving transducers are utilized and if the receiving transducer is mounted for rotation, a plurality of stationary transmitting transducers are provided. If the transducer is rotated at about a single axis, the reflector has an axis which is parallel to the axis of rotation so that the sound beams are focused into lines lying on a plane. If the transducer is rotated about two axes, the reflector is a parabolic reflector which focuses the sound beams emitted into points lying on the plane.

9 Claims, 2 Drawing Figures

PROCESS AND APPARATUS FOR RECORDING ACOUSTICAL HOLOGRAMS

BACKGROUND OF THE INVENTION

The present invention relates to an apparatus and method for recording acoustical holograms utilizing at least one ultrasonic transmitter for irradiating an object to be recorded, one sound receiver for receiving a reflected sound, and an apparatus for converting the received sound signal and transforming it into an optical signal for recording as a hologram.

In acoustical holography, an object wave field emanating from an object is scanned by a receiving transducer which converts the received signal into electrical output signals which are in turn converted into light signals which are recorded row-by-row as holograms on a light sensitive medium. In order to spatially separate the image of the object from the non-diffracted light and the conjugate image during reconstruction of the hologram, optical holography during recording of the holograms normally uses a reference wave which is directed at an angle to the object wave.

In acoustical holography, the reference wave is usually added electronically to the electrical signal of the object wave since linear receivers are employed to record the sound waves.

A fundamental problem in recording acoustical holograms consists in finding a suitable sound transducer for the reception of the ultrasonic waves. The transducer must be able to scan the sound field with a high degree of sensitivity over as large as possible area. Hitherto, a particularly high degree of sensitivity could be achieved only by employing piezoelectric sound transducer. When using piezoelectric sound transducers, the sound field is electronically scanned either with a matrix of sound transducers or else is received or scanned spot-by-spot or row-by-row by mechanical translation of the sound transducer over the field.

However, due to the large number of sound transducers which are required, the use of a matrix of sound transducers is expensive. The mechanical scanning of the sound field by translating a sound transducer is a time consuming operation and rules out the possibility of making a holographic recording of a moving object.

SUMMARY OF THE INVENTION

The present invention is directed to providing an apparatus and method for recording acoustical holograms in which process and apparatus the previously time-consuming translation of the sound receivers is avoided so that the recording with wave-length-limited resolving power at rates comparable to television image scanning rates is possible. To accomplish these tasks, the apparatus and method utilizes first means for generating and transmitting or emitting ultrasonic sound and includes at least one ultrasonic transmitting transducer which has directional characteristics and emits a directional sound beam, second means for receiving sonic or sound signals and transforming the received signals into electrical signals and including at least one sound receiving transducer, means for adding a reference signal to the electrical signal to form a combined signal, means for recording the combined signal on a recording medium as a hologram, means for mounting either the transducer of the first means or the second means for rotation about at least one axis, a reflector, which has a parabolic cross section on a plane extending perpendicular to the one axis, surrounding the mounted transducer and the other of the first and second means including a plurality of stationary transducers. If the mounting means only rotates the transducer about one axis, the means may be translatable parallel to the one axis and the reflector is an elongated reflector having an axis extending parallel to the one axis. The mounting means may rotate the mounted transducer about two intersecting axes which are at right angles to one another and the reflector is a parabolic reflector having a focal point at the point of intersection of the axis.

DESCRIPTION OF THE PREFERRED EMBODIMENTS

Figure 2:
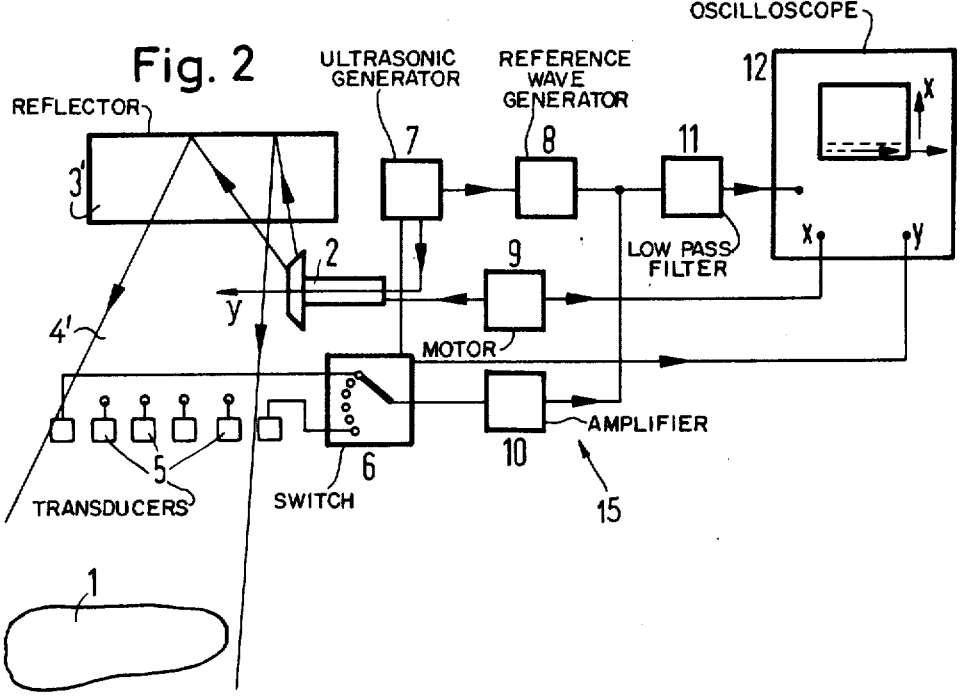
FIG. 2 is a schematic presentation of another embodiment of the present invention with the apparatus for generating the signal and recording the hologram.

The principles of the present invention are particularly useful in an apparatus generally indicated at 15 in FIG. 2 for projecting ultrasonic sound against an object 1, receiving the sound reflected by the object and recording an acoustical hologram.

Figure 1:
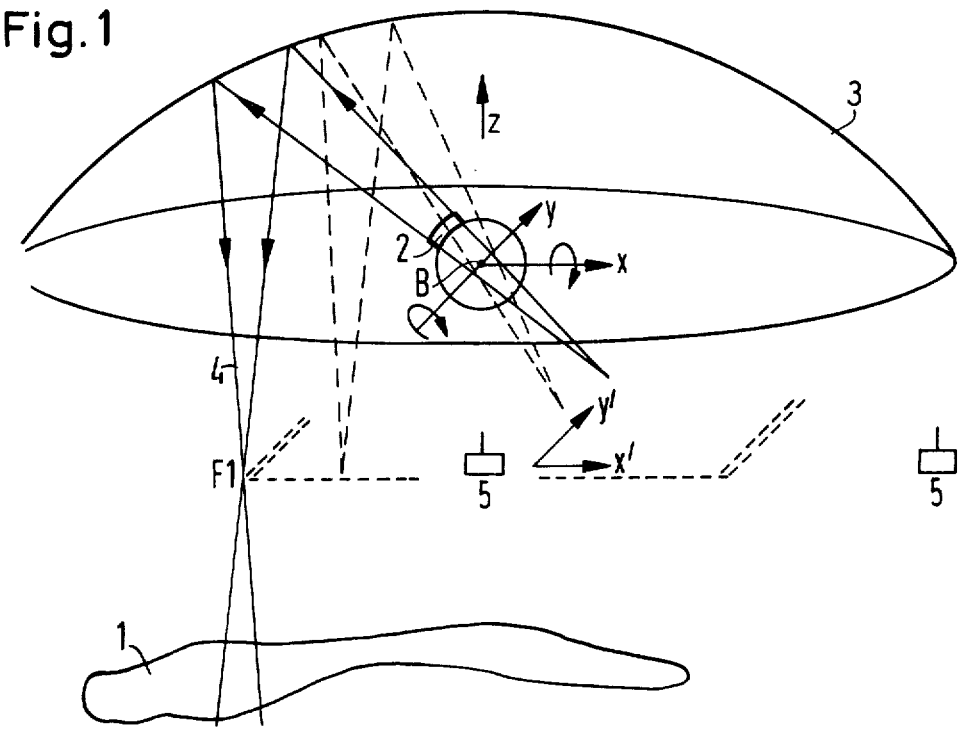
FIG. 1 is a schematic presentation of one embodiment of the present invention.

In the embodiment illustrated in FIG. 1, a transducer 2, which is illustrated as a transmitting transducer that emits a directionalized beam of sound and supplied with energy from an ultrasonic generator 7 (FIG. 2), is mounted by means which selectively rotates the transducer about two intersecting axes $x$ and $y$ which are at right angles to each other. The rotation about each axis is controlled by a motor device 9. As the transducer 2 is rotated, the beam of sound emitted by the transducer 2 will be projected in different directions from the point of intersection B of the axes $x$ and $y$ (FIG. 1).

A reflector 3 which is illustrated as a parabolic reflector, which is formed by rotating a parabola about axis $z$ which partially surrounds the transducer 2 and reflects the sound toward the object 1. Due to the curved surface of the reflector 3, each beam striking the reflector regardless of its direction due to rotation of the transducer is reflected as a reflected beam 4 which extends parallel to the axis $z$ and each reflected beam 4 is focused by the surface of the reflector to a point F1 which lies in a plane $x'$, $y'$ which is formed by the focal points of all of the reflected beams. As illustrated, the focal point of the reflector 3 lies at the point B which is the intersection of the two axes $x$ and $y$.

To receive the sound field reflected by the object 1, one or several stationary receiving transducers 5 are positioned in a plane which either coincides with the plane $x'$, $y'$ or is parallel thereto. Each of the stationary transducers 5 will transform the reflected sonic or sound signal into an electrical signal. The use of a single stationary transducer is sufficient to record a hologram, while the use of several transducers will increase the aperture and thus the resolution of the hologram electrical signal of each transducer 5 is sequentially connected by a change-over switch 6 to an amplifier 10 which amplifies the signal. The amplified signal has a reference wave added to it to form a combined signal. The reference wave is from a generator 8 which is connected to ultrasonic generator 7 and produces an electrical signal coherent with the output of ultrasonic generator 7. The combined signal is filtered by a low pass filter 11 which is applied to an electro-optical transducer 12 which is illustrated as an oscilloscope which will produce an oscillograph as a function of the position of point F in the plane $x'$, $y'$, which function is applied to the oscilloscope 12 from the motor device 9 and the switch 6. The oscillograph may be recorded in a conventional manner by film or on a reversible material.

Instead of recording the combined signal using the oscilloscope, the combined signal may be used to modulate a beam of light such as a laser beam which is deflected by a beam deflector means. When a light beam is used, the holographic recording can be made on either a photographic film or a thermoplastic material in a conventional manner.

To reconstruct the recorded hologram from the storage medium, a conventional method of reconstruction with a laser beam is used.

In the embodiment of FIG. 1, the transducer 2 was rotated about the two axes $x$ and $y$ and the motor device was constructed to provide both types of rotation. In the embodiment of FIG. 2, the transducer 2 is rotated only about the $y$ axis to simplify the technical aspects of the invention.

With the rotation of the transducer 2 being limited to one axis, for example the $y$ axis as illustrated in FIG. 2, a "cylindrical" parabolic reflector 3' is used. The reflector 3' is elongated along an axis extending parallel to the $y$ axis and has a parabolic cross section taken in a plane perpendicular to the axis and the plane of the drawing. The beam from the transducer 2 regardless of its direction is reflected by the reflector 3' as a reflected beam 4' which will be parallel to the axis $z$. The directional characteristics of the transducer 2 during rotation about the $y$ axis is selected to be such that the reflector 3' will focus the beam 4' in the $x$ direction to a point but the beam 4' diverges in the Y direction and thus the beam 4' is in focus to a line of focus which extends parallel to the $y$ axis and lies in the plane $x'$, $y'$. The sound field reflected from the object 1 is electronically scanned by a row of sound transducers 5 running parallel to the $y$ axis for each position $x$ of the beam emitted by the transducer 2. As in the previous case, a reference signal, which is coherent to the transmitter 2, is added to the electrical signal created from the reflected sound received by the receiver 5 and the sum of the signal is filtered by the low pass filters 11 and recorded on an intensity-modulated oscillograph as the functions of $x$ and $y$.

With the embodiment of FIG. 2 and process of the invention, it is also possible to record mono-dimensional or one dimensional holograms as a function of receiving time. In such a situation, a directed ultrasonic beam from a transmitting transducer 2, which rotates about the $y$ axis, produces a short ultrasonic pulse. The sound beam is focused in the $x$-direction by the "cylindrical" parabolic reflector 3' along a focal line and the extent or width of the sound beam is maintained small in the $y$ direction by a suitable choice of transducer 2. The signal reflected by the object 1 is in this case received with a single sound receiver 5 and after the addition of a coherent reference signal, it is applied to an oscilloscope which is intensity modulated in accordance with the combined signal as a function of time. The transmitting transducer 2 is then rotated to the next position and the process is repeated for all positions of the sound field.

In this way a mono-dimensional hologram is recorded on an oscilloscope for each object distance. These holograms are portrayed on films or reversible material so that by means of a coherent optical processing, the section of the plane $x'$, $y'$ of the object can be reconstructed. The processes known from side viewing radar and sonar can be used to reconstruct the sectional planes. If various sectional planes of the objects are desired, they can be recorded by means of suitable translation of the transmitting transducer 2 in a direction which is parallel to the focal axis of the "cylindrical" parabolic mirror and the $y$-direction.

In both the embodiments of FIGS. 1 and 2, it is assumed that the transducer 2 which was mounted for rotation either around a single axis or two perpendicular intersecting axes was a transmitting transducer. It is within the principles of the present invention to place a receiving transducer of the means for receiving the reference signal in the position of transducer 2 and utilize a plurality of transmitting or emitting transducers which are positioned in a plane and at the positions illustrated by the transducers 5 in FIGS. 1 and 2.

When using a receiving or transmitting transducer as transducer 2, the resolving power of the arrangement is determined by the aperture of the parabolic reflector 3. The resolving power can be increased or multiplied by the addition of one or more additional receivers or transmitters 5 at the plane $x'$, $y'$.

The apparatus and process of the present invention are based on principles which are known from side view radar and which during the recording of holograms, a translation of a transmitter and a receiver is equivalent. In accordance with the principles of the present invention, during the recording of holograms, no translation of the transmitter is actually carried out as in the previous known process but is simulated by suitable guidance and focusing of the sound beams.

Although various minor modifications might be suggested by those versed in the art, it should be understood that I wish to employ within the scope of the patent granted hereon all such modifications as reasonably and properly come within the scope of my contribution to the art.

I claim:

1. In an apparatus for recording acoustical holograms comprising first means for generating and transmitting ultrasonic sound and including at least one ultrasonic transmitting transducer, second means for receiving the sonic signal and transforming it into an electrical signal and including at least one sound receiving transducer, means for adding a reference signal to the electrical signal to form a combined signal and means for recording the combined signal on a recording medium as a hologram, the improvement comprising each ultrasonic transmitting transducer having a directional characteristic, means for mounting the transducer of one of said first and second means for rotation about at least one axis, a reflector surrounding the mounted transducer and having a parabolic cross section taken on a plane extending perpendicular to said one axis, and another of said first and second means having a plurality of stationary transducers.

2. In an apparatus according to claim 1, wherein said reflector is an elongated reflector having an axis extending perpendicular to said plane and the reflector is mounted with its axis extending parallel to said one axis of rotation.

3. In an apparatus according to claim 2, wherein said mounted transducer is the transducer of the first means and said plurality of stationary transducers are the transducers of the second means.

4. In an apparatus according to claim 3, wherein said axis of the reflector and said one axis are coaxial.

5. In an apparatus according to claim 3, wherein said means for mounting is movable in translation parallel to the axis of the reflector.

6. In an apparatus according to claim 2, wherein said mounted transducer is the transducer of the second means and wherein said plurality of transducers are the transducers of the first means.

7. In an apparatus according to claim 1, wherein the means for mounting enables rotation about two intersecting axes extending at right angles to one another and wherein the reflector is a parabolic reflector having a focal point at the intersection of the two axes.

8. In an apparatus according to claim 7, wherein the means for mounting mounts the transducer of the first means and said plurality of transducers are the transducers of the second means.

9. In an apparatus according to claim 7, wherein the means for mounting mounts the transducer of the second means and the plurality of transducers are the transducers of the first means.

* * * * *